(12) United States Patent
Leung et al.

(10) Patent No.: US 6,775,047 B1
(45) Date of Patent: Aug. 10, 2004

(54) ADAPTIVE BIPOLAR OPERATION OF MEM DEVICE

(75) Inventors: Omar S. Leung, Palo Alto, CA (US); Akira Tomita, Redwood City, CA (US); David T. Amm, Sunnyvale, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 0 days.

(21) Appl. No.: 10/225,376

(22) Filed: Aug. 19, 2002

(51) Int. Cl.[7] .............................................. G02B 26/00
(52) U.S. Cl. ........................ 359/290; 359/291; 359/223
(58) Field of Search ................................ 359/290, 291, 359/295, 223, 224, 322, 238, 230, 566, 572, 573, 578, 579

(56) References Cited

U.S. PATENT DOCUMENTS

| | | | | |
|---|---|---|---|---|
| 5,311,360 A | * | 5/1994 | Bloom et al. | ............... 359/572 |
| 5,444,566 A | * | 8/1995 | Gale et al. | ................... 359/291 |
| 6,215,579 B1 | | 4/2001 | Bloom et al. | |

OTHER PUBLICATIONS

D.M. Bloom, et al. "The Grating Light Valve: revolutionizing display technology" Feb. 1997, 10 sheets, vol. 3013; Projection Displays III Symposium, San Jose, CA.
D.T. Amm, et al. "Grating Light Valve Technology: Update and Novel Applications", May 19, 1998, pp. 1–4, Silicon Light Machines. Presented at Society for Information Display Symposium, Anaheim, CA.
David T. Amm, et al. "Optical Performance of the Grating Light Valve Technology", 1999, pp. 1–8, Silicon Light Machines. Presented at Photonics West–Electronics Imaging.
R.W. Corrigan, et al. "An Alternative Architecture for High Performance Display", Nov. 20, 1999, pp. 1–5, Silicon Light Machines. Presented at SMPTE Technical Conference and Exhibition, New York, NY.
R.W. Corrigan, et al. "Calibration of a Scanned Linear Grating Light Valve Projection System", May 18, 1999, pp. 1–4, Silicon Light Machines. Presented at Society for Information Display Symposium, San Jose, CA.
Robert Corrigan, et al. "Silicon Light Machines—Grating Light Valve Technology Brief", Jun. 2001, pp. 1–8; Sunnyvale, California.

* cited by examiner

*Primary Examiner*—Georgia Epps
*Assistant Examiner*—Tuyen Tra
(74) *Attorney, Agent, or Firm*—Okamoto & Benedicto LLP

(57) ABSTRACT

One embodiment disclosed relates to a method for adaptive bipolar operation of a micro electromechanical (MEM) device. The method includes driving the MEM device in a first polarity, determining when an offset passes a first threshold, and switching from the first polarity to a second polarity when the offset passes the first threshold. Another embodiment disclosed relates to an apparatus for adaptive bipolar operation of a MEM device. The apparatus includes a first look-up table (LUT) for use in driving the MEM device in a first polarity, a circuit for determining when an offset passes a first threshold, and a polarity switch for switching from the first polarity to a second polarity when the offset passes the first threshold.

20 Claims, 16 Drawing Sheets

| Element ID 802 | Desired Intensity 804 | Drive Voltage Level 806 |
|---|---|---|
| 1 | 0 | 0 |
| 1 | 1 | 2.8 |
| 1 | 2 | 4.1 |
| ... | ... | ... |
| 1024 | 253 | 12.7 |
| 1024 | 254 | 13.5 |
| 1024 | 255 | 13.8 |

| Element ID 802 | Desired Intensity 804 | Drive Voltage Level 806 |
|---|---|---|
| 1 | 0 | 0 |
| 1 | 1 | -2.9 |
| 1 | 2 | -4.0 |
| ... | ... | ... |
| 1024 | 253 | -12.4 |
| 1024 | 254 | -12.8 |
| 1024 | 255 | -13.1 |

ADAPTIVE BIPOLAR OPERATION OF MEM DEVICE

BACKGROUND OF THE INVENTION

1. Field of the Invention

The present invention relates generally optical systems. The present invention relates more particularly to micro electromechanical devices (MEMs) that may be used in optical systems.

2. Description of the Background Art

Arrays of light-modulating elements may be applied to communications systems. The light-modulating elements may comprise, for example, GRATING LIGHT VALVE (GLV) elements. For example, the arrays may be used as a micro electromechanical system (MEMS) for use in optical networks. In another application, a two-dimensional projection image may also be formed by using one or more linear arrays of light-modulating elements. In such display systems, the linear array modulates an incident light beam to display pixels along a column (or, alternatively, a row) of the two-dimensional (2D) image. A scanning system is used to move the column across the screen such that each light-modulating element Is able to generate a row of the 2D image. In this way, the entire 2D image is displayed. There are also other applications of light-modulating elements.

Publications describing GLV devices and their applications include: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "Calibration of a Scanned Linear Grating Light Valve Projection System," R. W. Corrigan, D. T. Amm, P. A. Alioshin, B. Staker, D. A. LeHoty, K. P. Gross, and B. R. Lang, a paper presented at the Society for Information Display Symposium, May 18, 1999, San Jose, Calif.; "An Alternative Architecture for High Performance Display," R. W. Corrigan, B. R. Lang, D. A. LeHoty, and P. A. Alioshin of Silicon Light Machines, a paper presented at the 141 st SMPTE Technical Conference and Exhibition, Nov. 20, 1999, New York, N.Y.; "Breakthrough MEMS Component Technology for Optical Networks," Robert Corrigan, Randy Cook, and Olivier Favotte, Silicon Light Machines—Grating Light Valve Technology Brief, 2001; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety.

FIG. 1 is a diagram depicting the reflective and diffractive operational states of a GRATING LIGHT VALVE (GLV) element. The left side of the diagram depicts the reflective (dark) state, while the right side of the diagram depicts the diffractive (bright) state.

In the example illustrated in FIG. 1, the substrate may comprise a silicon substrate with oxide (for example, about 5000 angstroms thick) overlaying the silicon, and tungsten (for example, about 1000 angstroms thick) overlaying the oxide. The reflective members lie above the tungsten with an air space there between. For example, three pairs of reflective members (i.e. six members) are shown. The reflective members may, for example, comprise reflective ribbons comprising nitride (for example, about 1000 angstroms thick) with a reflective layer of aluminum (for example, about 500 angstroms thick) on the nitride. Incident light is beamed onto the reflective members. The incident light beam may be at a perpendicular angle to the plane of the substrate.

In the reflective or dark state (left side), all the reflective members are in the same plane, and the incident light is reflected from the surfaces of the members. This reflective state may be called the dark state because it may be used to produce a dark spot (dark pixel) in a projection display system. Such a dark pixel may be produced by blocking the light that is reflected back along the same path as the incident light.

In the diffractive or bright state (right side), alternate ones of the reflective members are deflected downward. This results in the diffraction of the incident light in a direction that is at an angle to the path of the incident light. This reflective state may be called the bright state because it may be used to produce a bright spot (bright pixel) in a projection display system. Such a bright pixel may be produced because the angularly reflected light is not blocked. As discussed further below, the optical response of the element depends on the amount of downward deflection of the alternate members.

FIG. 2 is an illustration depicting a GLV element comprising pairs of fixed and movable ribbons. As depicted in FIG. 2, the GLV element may include pairs of reflective ribbons, each pair having one fixed and one movable ribbon.

FIG. 3 is a diagram depicting deflections of reflective members for a GLV element in a diffractive state. The GLV element comprises a plurality of reflective members. The reflective members comprise alternating bias members 304 and active member 306. In the example illustrated, the GLV element includes three pairs of reflective members (i.e. six of them).

In the diffractive state, the reflective members are controllably arranged in an alternating configuration at two heights from a common electrode 308, where bias members 304 are at a first height and active (movable) members 306 are at a second height. The bias members 304 may be fixed ribbons. The active members 306 may be movable ribbons pulled down by application of a voltage. The voltage may be applied with respect to the common electrode 308. As illustrated in FIG. 3, the incident light beam 310 impinges upon the element at an angle perpendicular to the grating plane. Diffracted light 312 travels away from the element.

The difference between first and second heights may be defined as the deflection distance $\gamma$. The amount of the deflection $\gamma$ may be varied by application of different voltages to control the amount of incident light reflected from the element. When $\gamma$ is near zero, the element would be near a maximally reflective state. When $\gamma$ is near $\lambda/4$, where $\lambda$ is the wavelength of the incident light, the element would be near a maximally diffractive state.

FIG. 4 is a graph illustrating a unipolar electro-optic response for a first order diffraction from a GLV element. The graph shows intensity of light (in arbitrary units) from the first order diffraction versus voltage. The higher the voltage is, the larger is the displacement $\gamma$ of the element. Depending on the voltage applied to the active members, the light intensity varies. For the most part, the higher the applied voltage, the higher the light intensity for the first order diffraction. (This relationship reverses for sufficiently high voltages where the light intensity reduces with higher voltages, and hence the downward slope of the graph at the far right.)

FIG. 5A is a diagram illustrating elements of a light-modulating array being utilized as variable optical attenuators (VOAs) for a dynamic gain equalizer (DGE). The multiple VOA devices shown in FIG. 5B may correspond to GLV devices in a linear array. The input light signals of various wavelengths ($\lambda_1, \lambda_2, \lambda_3, \ldots \lambda_N$) may originally have various amplitude levels. The multiple wavelengths are dispersed by the dispersive element onto the multiple VOA devices. Each wavelength may be attenuated a variable amount by the VOA device on which it impinges. The wavelengths may then be combined by the combining element and subsequently amplified, for example, by an erbium doped fiber amplifier (EDFA). As a result, the amplitudes (gain levels) of the various wavelengths may be equalized.

FIG. 5B is a top view depicting a projection display system 500 utilizing a light-modulating array. The system 500 includes one or more light sources 502, one or more arrays of light-modulating elements 504, an optical scanner 506, and a screen 508. The figure is for explanatory purposes and is not necessarily accurate in scale or angles.

The light source 502 may comprise one or more laser light sources. Three laser light sources of different colors may be utilized for a color display system. The light-modulating array 504 may comprise an array of GLV elements (also called GLV "pixels") described above. Each light source 502 may illuminate a light-modulating array 504. Each element of an array 504 modulates the light incident on it to control the amount of light diffracted therefrom. The diffracted light from the elements of the array 504 is then directed to the optical scanner 506.

The optical scanner 506 is used to move the column (or row) of light across the screen 508. Various types of scanners 506 may be used. For example, galvonometer-based scanners, resonant scanners, polygon scanners, rotating prisms, or other types of scanners may be used. A drive signal is applied to the scanner to control ("drive") the movement of the column (or row) of light. For example, to achieve a progressive scan of the column across the screen (e.g., from left to right), a sawtooth drive signal may be used.

One disadvantageous aspect of using GLV and other MEMS technology relates to changes in device performance as a function of time. Whether used in a communication or other system, the response function of a GLV element and other MEMS devices has been observed to change over time. Such time-dependent changes can lead to unpredictable behavior and thus may limit the applications for GLV elements and other MEMS devices.

SUMMARY

One embodiment of the invention relates to a method for adaptive bipolar operation of a micro electromechanical (MEM) device. The method includes driving the MEM device in a first polarity, determining when an offset passes a first threshold, and switching from the first polarity to a second polarity when the offset passes the first threshold.

Another embodiment of the invention relates to an apparatus for adaptive bipolar operation of a MEM device. The apparatus includes a first look-up table (LUT) for use in driving the MEM device in a first polarity, a circuit for determining when an offset passes a first threshold, and a polarity switch for switching from the first polarity to a second polarity when the offset passes the first threshold.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 8A is a diagram depicting a first look-up table of a first polarity.

FIG. 8B is a diagram depicting a second look-up table of a second polarity.

The use of the same reference label in different drawings indicates the same or like components. Drawings are not to scale unless otherwise noted.

DETAILED DESCRIPTION

One cause of the time-dependent performance of GLV technology relates to charge build-up in the light-modulating elements. As an element operates, electrical charge can build up on the dielectric surfaces of the devices. This charge build-up disadvantageously results in changes in performance over time. The present invention provides an improved method and apparatus for overcoming such disadvantageous charge build-up. The invention is particularly applicable to GLV elements, but it may also be applicable to other MEMS devices. The invention may result in less time-dependent behavior of such devices and may be used in both communications and display systems.

A system using bipolar operation in general to reduce charge build-up in the devices is described in commonlyowned U.S. patent application No. 10/183,579, entitled "Bipolar Operation of Light-Modulating Array," filed Jun. 26, 2002, by inventors David A. LeHoty and Bryan Staker, the disclosure of which is hereby incorporated by reference in its entirety. However, instead of using an arbitrary duty cycle (for example, a 50—50 duty cycle) for switching between polarities, the present invention adaptively switches between polarities when measured offsets exceed threshold values.

Figure 6:
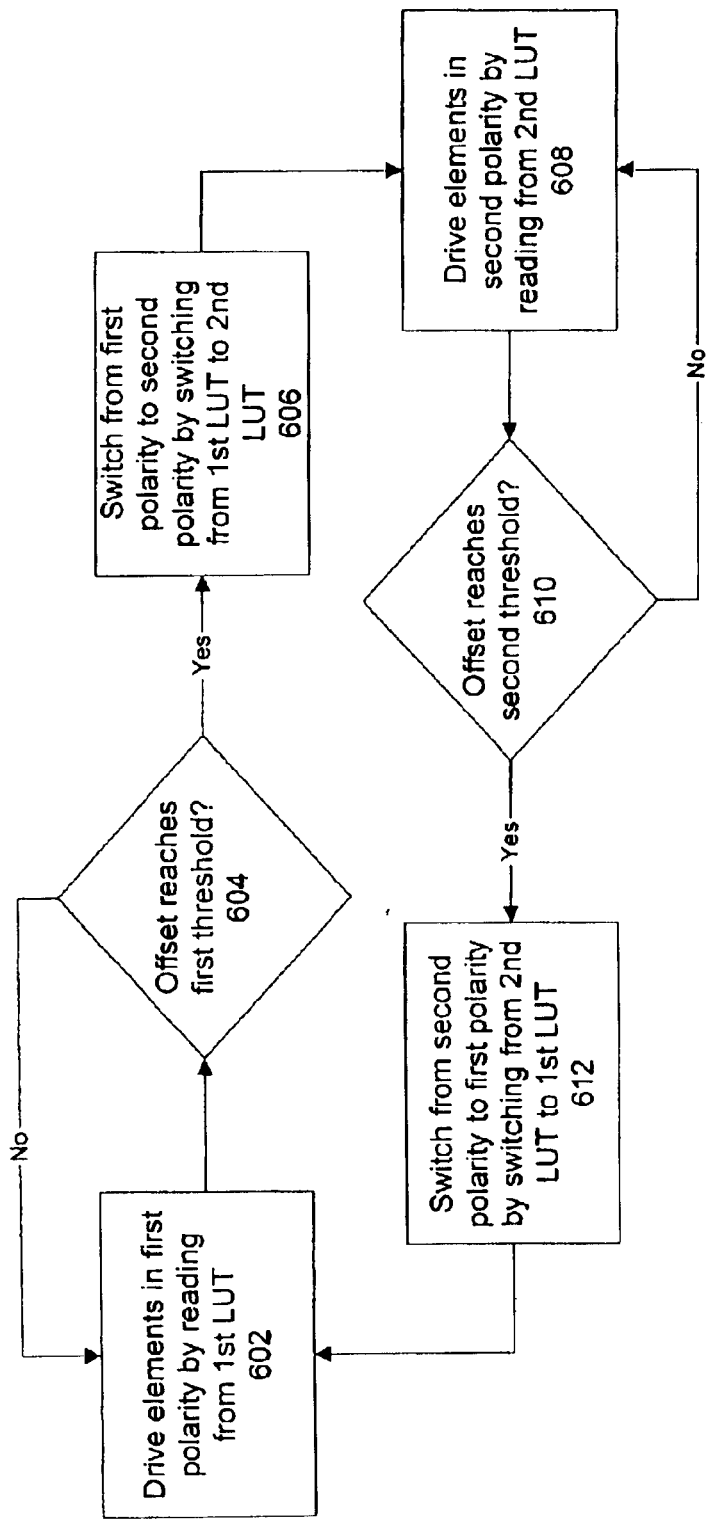
FIG. 6 is a flow chart depicting a method for bipolar operation of a light-modulating array.

FIG. 6 is a flow chart depicting a first adaptive method 600 for bipolar operation of a light-modulating array. As depicted, the first adaptive method 600 includes six steps (602, 604, 606, 608, 610, and 612).

In the first step 602, elements of the array are driven in a first polarity. The first polarity refers to an applied electric potential where the voltages driving the active elements are generally more positive than the voltage at the bias element and the common electrode. For example, the first polarity may correspond to positive voltages being applied to the active element while the bias element and the common electrode are held at ground (zero volts). For each element, the voltage to be applied to attain a desired intensity level may be determined by using a first look-up table (LUT). An example of such a first LUT is described below in relation to FIG. 8A.

In the second step 604, a determination is made of whether an offset exceeds a first threshold. This determination may be made periodically by measuring intensities at one or more elements of the array at one or more voltages and comparing the intensities measured against corresponding one or more first threshold values. The first threshold values may be predetermined as intensity values near the bounds of acceptable performance for operation in the first polarity. In other words, beyond the first threshold value, the performance in the first polarity is not necessarily acceptable due to the excessive offset. Offsets and threshold values are described further below in relation to FIGS. 9, 10A and 10B.

In the third step 606, the apparatus switches from operating in a first polarity mode to operating in a second polarity mode. The switch in polarity may be accomplished by switching from using the first LUT to using a second LUT.

In the fourth step 608, elements of the array are driven in the second polarity. The second polarity refers to an applied electric potential where the voltages driving the active elements are generally more negative than the voltage at the bias element and the common electrode. In one implementation, the second polarity may correspond to negative voltages being applied to the active element while the bias element and the common electrode are held at ground. In another implementation, the second polarity may correspond to positive voltages being applied to the bias element and the common electrode while the active element is held at ground. For each element, the voltage to be applied to attain a desired Intensity level may be determined by using a second look-up table (LUT). An example of such a second LUT is described below in relation to FIG. 8B.

In the fifth step 610, a determination is made of whether an offset exceeds a second threshold. This determination may be made periodically by measuring intensities at one or more elements of the array at one or more voltages and comparing the intensities measured against corresponding one or more second threshold values. The second threshold values may be predetermined as intensity values near the bounds of acceptable performance for operation in the second polarity. In other words, beyond the second threshold value, the performance in the second polarity is not necessarily acceptable due to the excessive offset. Offsets and threshold values are described further below in relation to FIGS. 9, 10A and 10B.

In the sixth step 612, the apparatus switches from operating in the second polarity mode back to operating in the first polarity mode. This switch in polarity may be accomplished by switching from using the second LUT to using the first LUT. After the sixth step 612, the process 600 loops back to the first step 602.

By switching polarities when offsets exceed thresholds as described above, the electric fields in the elements of the array may be reversed in a way that keeps the offsets within the threshold limits. This advantageously can maintain the performance of the device within acceptable bounds.

Figure 7:
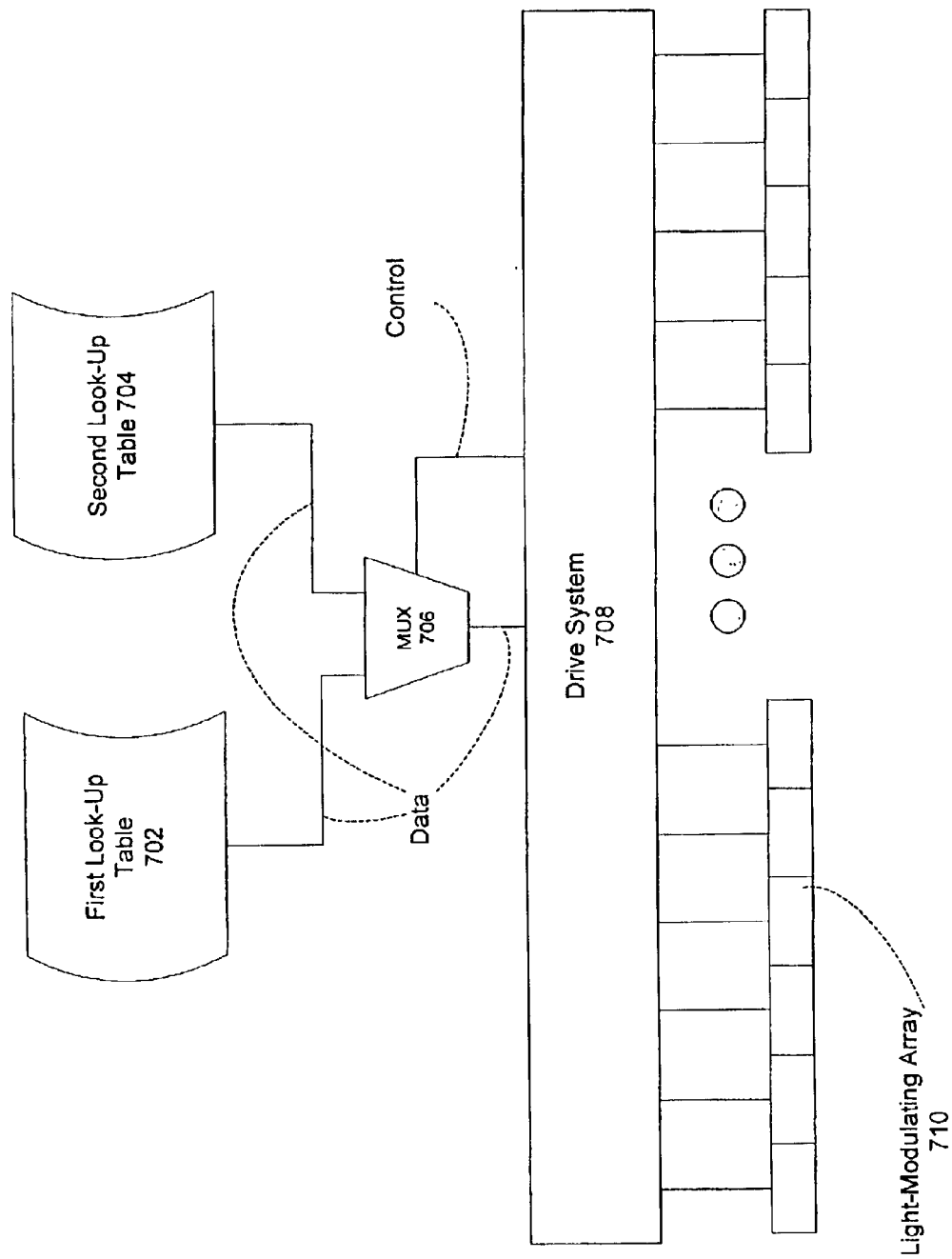
FIG. 7 is a diagram depicting an apparatus for bipolar operation of a light-modulating array.

FIG. 7 is a diagram depicting an apparatus 700 for bipolar operation of a light-modulating array. The apparatus 700 includes a first look-up table (LUT) 702, a second LUT 704, a multiplexor (MUX) 706, a drive system 708, and a light-modulating array 710.

The first LUT 702 provides data for use during operation in the first polarity mode, and the second LUT 704 provides data for use during operation in the second polarity mode. Examples of first and second LUTs are described below in relation to FIGS. 8A and 8B, respectively. The LUTs 702 and 704 may be implemented in a memory structure. In one embodiment, the LUTs would be implemented in a semiconductor memory that provides rapid access to the data stored therein.

The MUX 706 provides for selection of either the first LUT 702 or the second LUT 704. In the first polarity mode, the MUX 706 gives the drive system 708 access to data from the first LUT 702. In the second polarity mode, the MUX 706 gives the drive system 708 access to data from the second LUT 704. In one embodiment, the MUX 706 may be controlled by a control signal from the drive system 708. The control signal may simply be a bit signal such that the first LUT 702 is selected when the bit is high and the second LUT 704 is selected when the bit is low (or vice-versa).

The drive system 708 looks up drive voltages corresponding to desired intensities for each element of the light-modulating array 710. The drive system 708 then applies the looked-up voltage to the appropriate element of the array 710 to achieve the desired intensity from that element.

In an alternative configuration, both the first 702 and second 704 LUTs may be implemented as a combined LUT. Such a combined LUT would have data for both the first polarity mode and for the second polarity mode in a single table. Such a combined LUT would require a separate field to distinguish data for the first polarity mode from data for the second polarity mode.

FIG. 8A is a diagram depicting information in a first look-up table (LUT) 800 of a first polarity. The first LUT 800 includes three data fields: element identifier (ID) 802; desired intensity 804; and drive voltage level 806.

In this example, there are 1024 elements in the light-modulating array. Hence, the element IDs 802 depicted in FIG. 8A range from one (1) to one thousand twenty four (1024). Of course, various numbers of elements may be in the light-modulating array, and the number of element IDs 802 will vary accordingly.

The example shows the desired light intensity 804 ranging from 0 to 255. This corresponds to two hundred fifty six (256) intensity levels. Two hundred fifty six (256) different levels may be distinguished using eight (8) bits of information. Of course, various numbers of intensity levels may be available in different systems, and the number of desired intensities 804 will vary accordingly.

Figure 1:
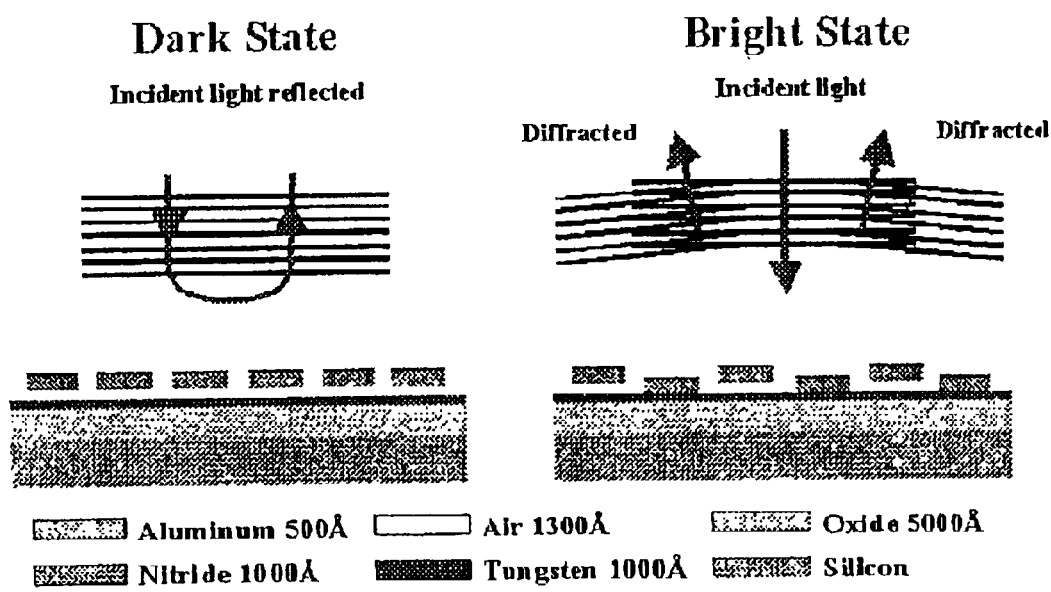
FIG. 1 is a diagram depicting the reflective and diffractive operational states of a conventional GRATING LIGHT VALVE (GLV) element.
Figure 2:
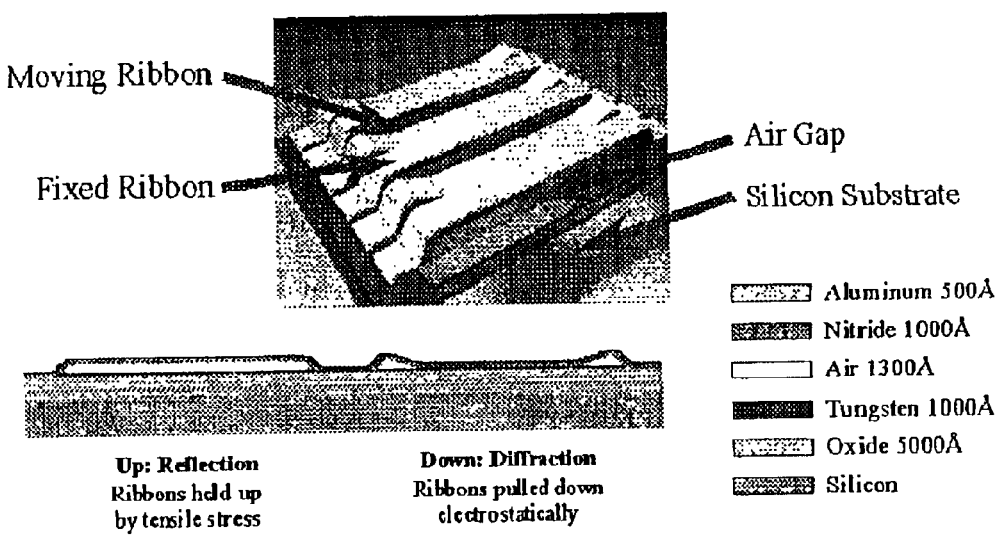
FIG. 2 is an illustration depicting a conventional GLV element comprising pairs of fixed and movable ribbons.
Figure 3:
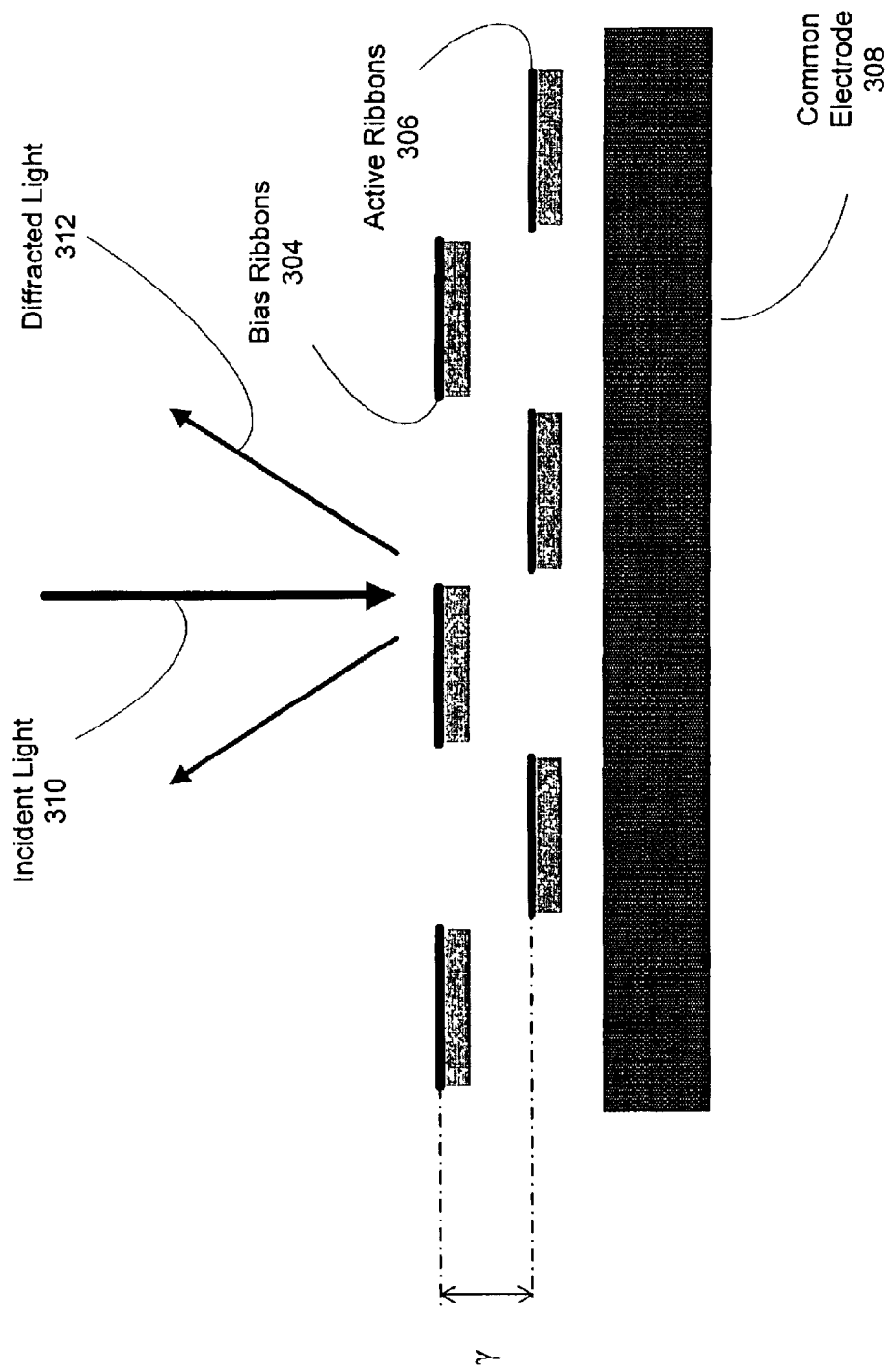
FIG. 3 is a diagram depicting deflections of reflective members for a conventional GLV element in reflective state.
Figure 4:
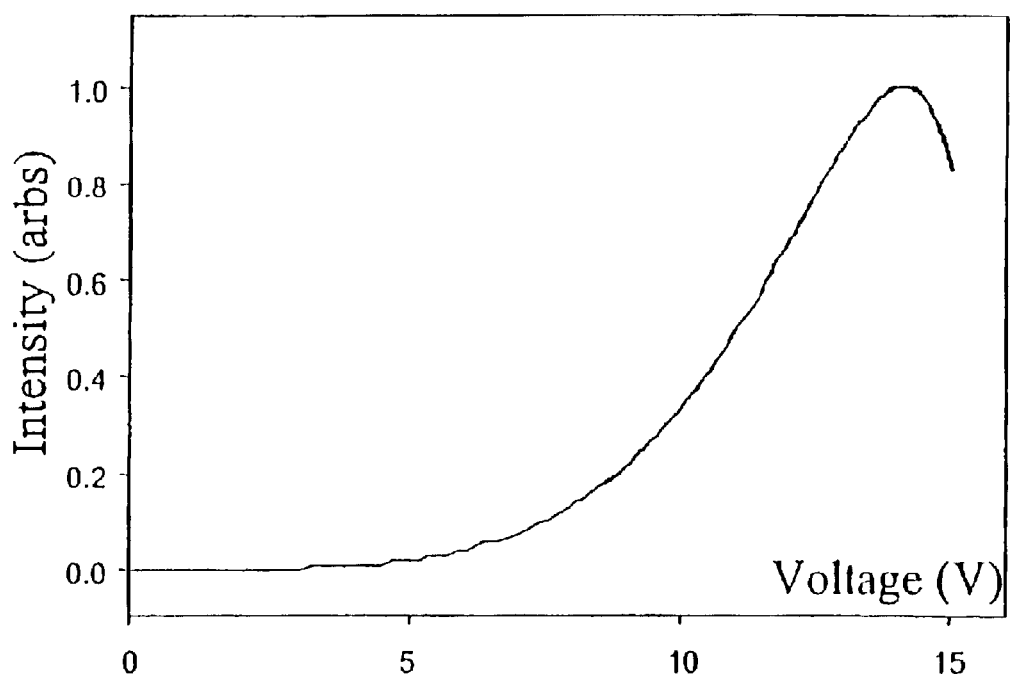
FIG. 4 is a graph illustrating a unipolar electro-optic response for a first order diffraction from a GLV element.
Figure 5A:
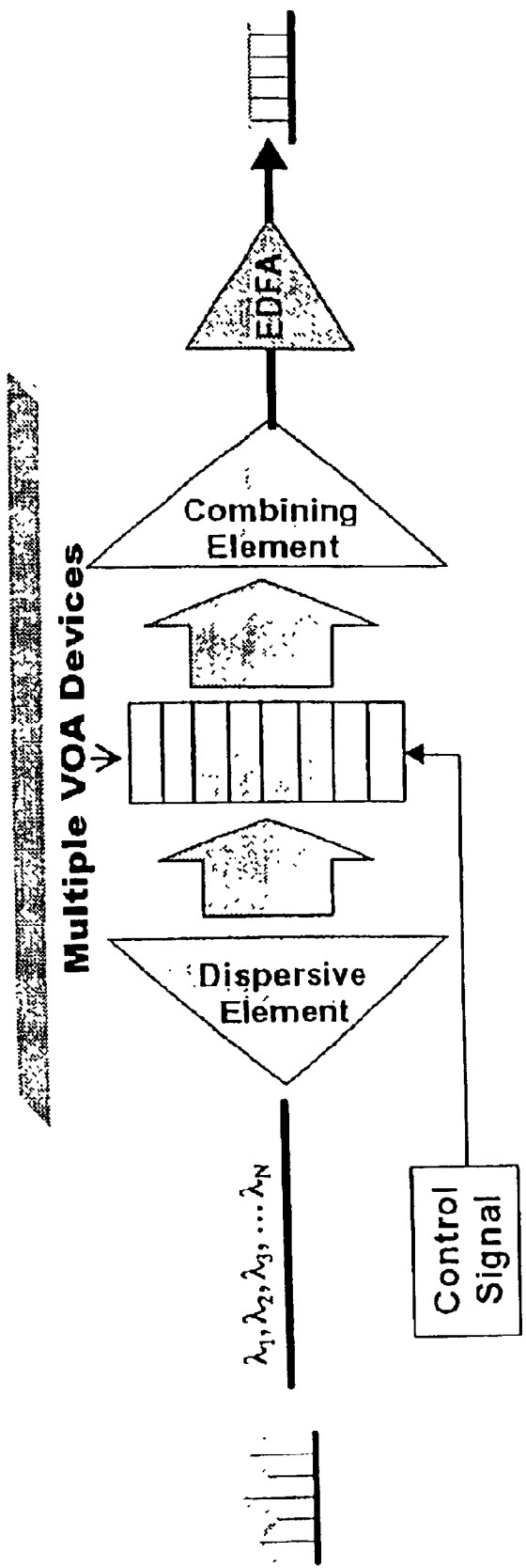
FIG. 5A is a diagram illustrating elements of a light-modulating array being utilized as variable optical attenuators (VOAs) for a dynamic gain equalizer (DGE).
Figure 5B:
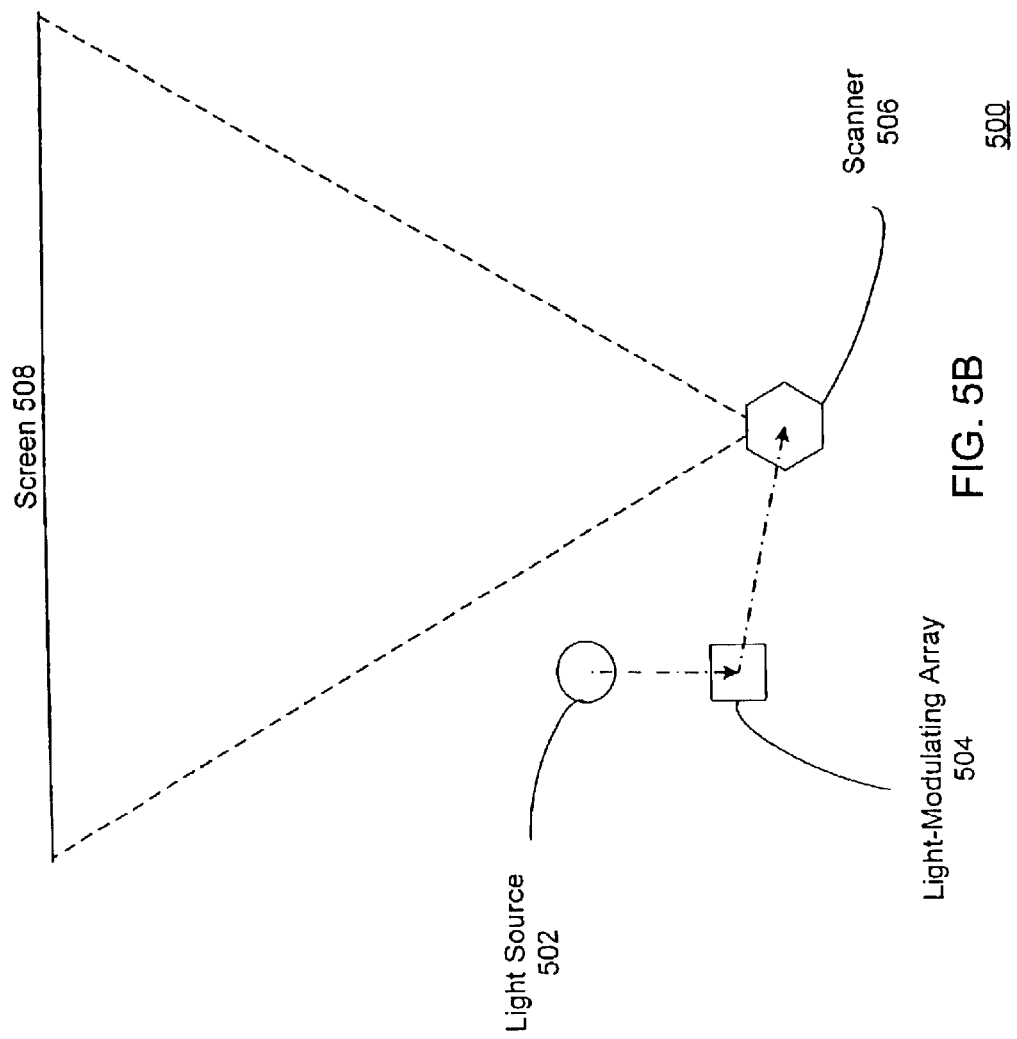
FIG. 5B is a top view depicting a projection display system utilizing a light-modulating array.

The values for the drive voltage levels 806 in FIG. 8A shown are for purposes of illustration. The drive levels are shown as varying between about zero volts (0 V) to about positive fourteen volts (13.8 V in the figure). For elements that comprise GRATING LIGHT VALVE devices, larger voltage differences are needed at the lower intensities, and smaller voltage differences are needed at the higher intensities. This is seen from the intensity versus voltage curve in FIG. 4.

The drive voltage levels 806 in the first LUT 800 may be determined by a calibration procedure. The calibration procedure may be performed periodically. As a result of the calibration, the appropriate positive drive level 806 to achieve each desired intensity 804 will be determined for each element 802 of the array. These calibration results are stored in the first LUT 800.

FIG. 8B is a diagram depicting information in a second look-up table 850 of a second polarity. The second LUT 850 includes the same three data fields (element ID 802; desired intensity 804; and drive voltage level 806) as the first LUT 800. Moreover, the data for the element IDs and for the desired intensity levels are the same in the second LUT 850 as in the first LUT 800. This is because the identification of the elements in the light-modulating array 710 does not change depending on the polarity mode, and the desired light intensities also do not change depending on the polarity mode.

However, the drive voltage levels 806 in the second LUT 850 do differ from those in the first LUT 800. The values for the drive voltage levels 806 in FIG. 8B shown are for purposes of illustration. The drive levels are shown as varying between about zero volts (0 V) to about negative thirteen volts (−13.1 V in the figure). In one embodiment, the second LUT 850 may actually store positive values that are converted to negative voltage levels when the system is in the second (negative) polarity mode.

The drive voltage levels 806 in the second LUT 850 may also be determined by periodic calibration. As a result of the calibration, the appropriate negative drive levels 806 to achieve each desired intensity 804 will be determined for each element 802 of the array. These calibration results are stored in the second LUT 850.

The following describes one particular implementation for the LUTs 800 and 850. In this implementation, the tables are combined to a single LUT such that the information for the first and second polarities are in different portions of the combined LUT. In this particular implementation, the number of elements may be 1088. Since 1088 is greater than 1024, eleven bits are needed to address each of the elements. This particular implementation may also specify 1024 different drive intensities using ten address bits. Hence the combined LUT uses twenty-one address bits per polarity to address the storage locations in the LUT. Each storage location may include ten bits for output. In this particular implementation, the eight most significant of the ten output bits may be used to specify 256 different drive levels. The remaining two bits effectively interpolate between the drive levels by using dithering. In this case, each image frame may be refreshed four times. Hence, the two bits may be used to dither between a first level and a next level during the frame refreshes. For example, if the two bits are both zero, then the first level may be displayed four times. If the two bits are zero and one, then the first level may be displayed three times and the next level displayed one time. If the two bits are one and zero, then the first level may be displayed twice and the next level displayed twice. Finally, if the two bits are both one, then the first level may be displayed once and the next level displayed three times. Other particular implementations of the LUT addressing and output may, of course, be used.

Figure 9:
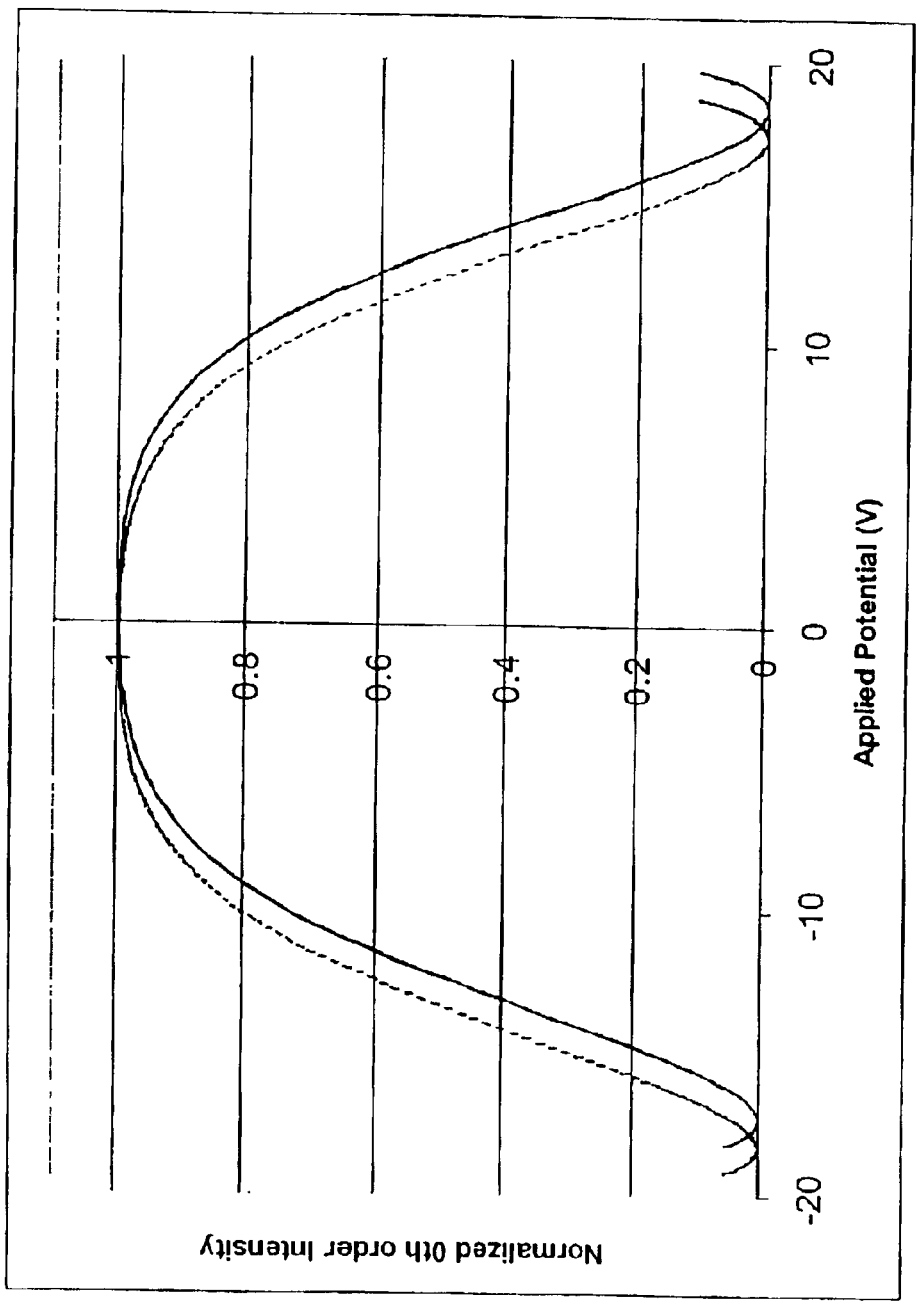
FIG. 9 is a graph depicting a bipolar electro-optic response for zero-order diffraction from a GLV element.

FIG. 9 is a graph depicting a bipolar electro-optic response for zero-order diffraction from a GLV element. The graph illustrates a normalized zero-order intensity versus the applied voltage. The applied voltage is applied to the ribbon electrode while the bias electrode and common electrode are held at ground. As shown in FIG. 9, the applied voltage may be either positive (a first polarity) or negative (a second polarity). Note that the response of the zero-order diffraction has opposite characteristics when compared with the response of the first-order diffraction in FIG. 4. For the zero-order diffraction, when the applied potential is near zero volts, the intensity is high. In contrast, for the first-order diffraction, when the applied potential is near zero volts, the intensity is low. This oppositeness is due to the nature of the zero-order and first-order diffractions.

In FIG. 9, the solid curve represents the normalized initial response prior to charge build-up in the GLV element. The dashed curve represents the normalized response with an example lateral shift or offset due to charge build-up. The direction, magnitude, and rate of the voltage offset may depend on several factors, such as electric field direction, charge carrier species and density, temperature, device design, and other factors.

Figure 10A:
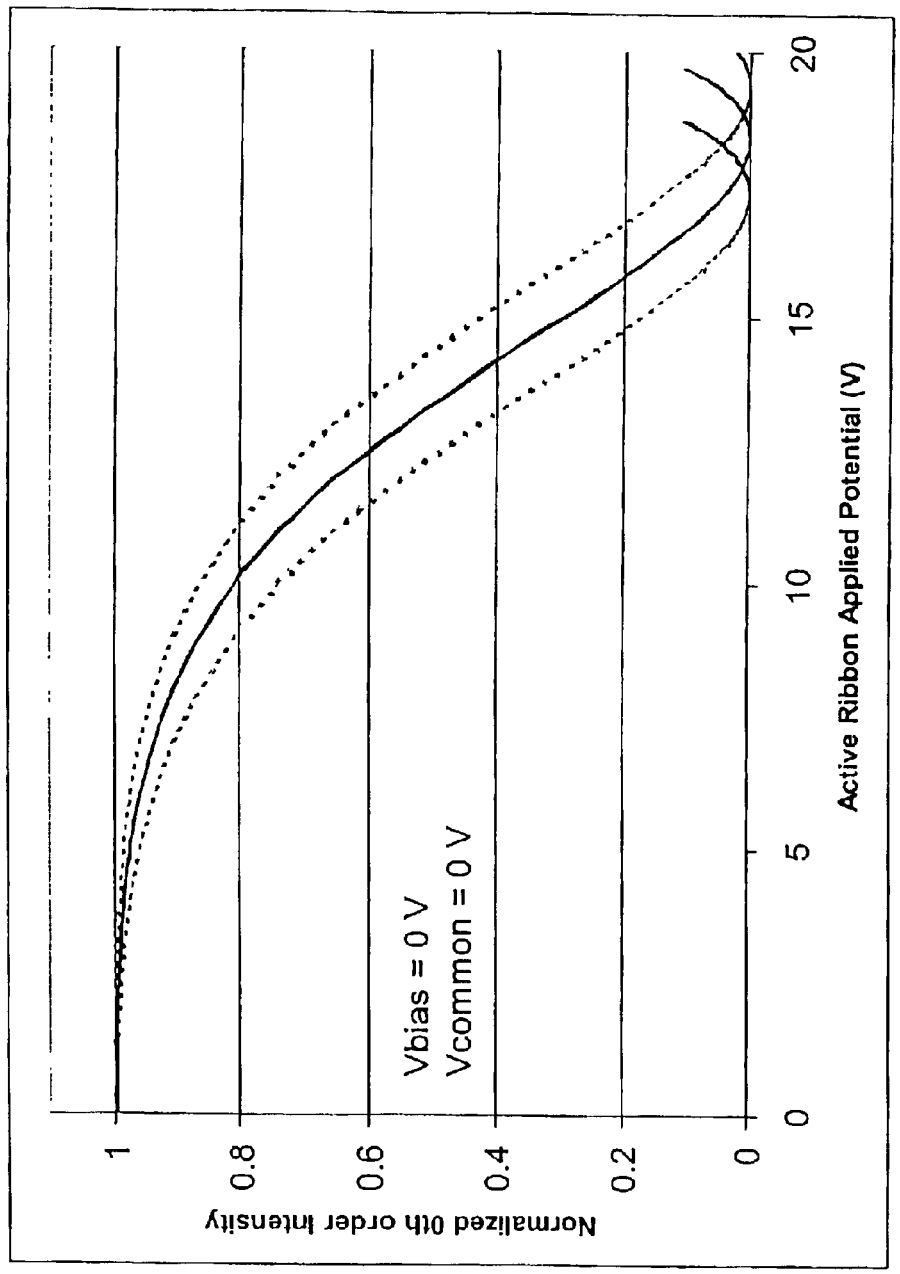
FIG. 10A is a graph depicting an electro-optic response for zero-order diffraction from a GLV element in a first unipolar configuration.

FIG. 10A is a graph depicting an electro-optic response for zero-order diffraction from a GLV element operating in a first polarity. As shown by FIG. 10A, the first polarity in this instance comprises a positive applied voltage to the active ribbon (while bias ribbon and common electrode are held at ground). The solid curve represents the normalized initial response prior to charge build-up in the GLV element. The two dashed curves represent the normalized responses with example offsets due to charge build-up. Again, the direction, magnitude, and rate of the voltage offset may depend on several factors.

Figure 10B:
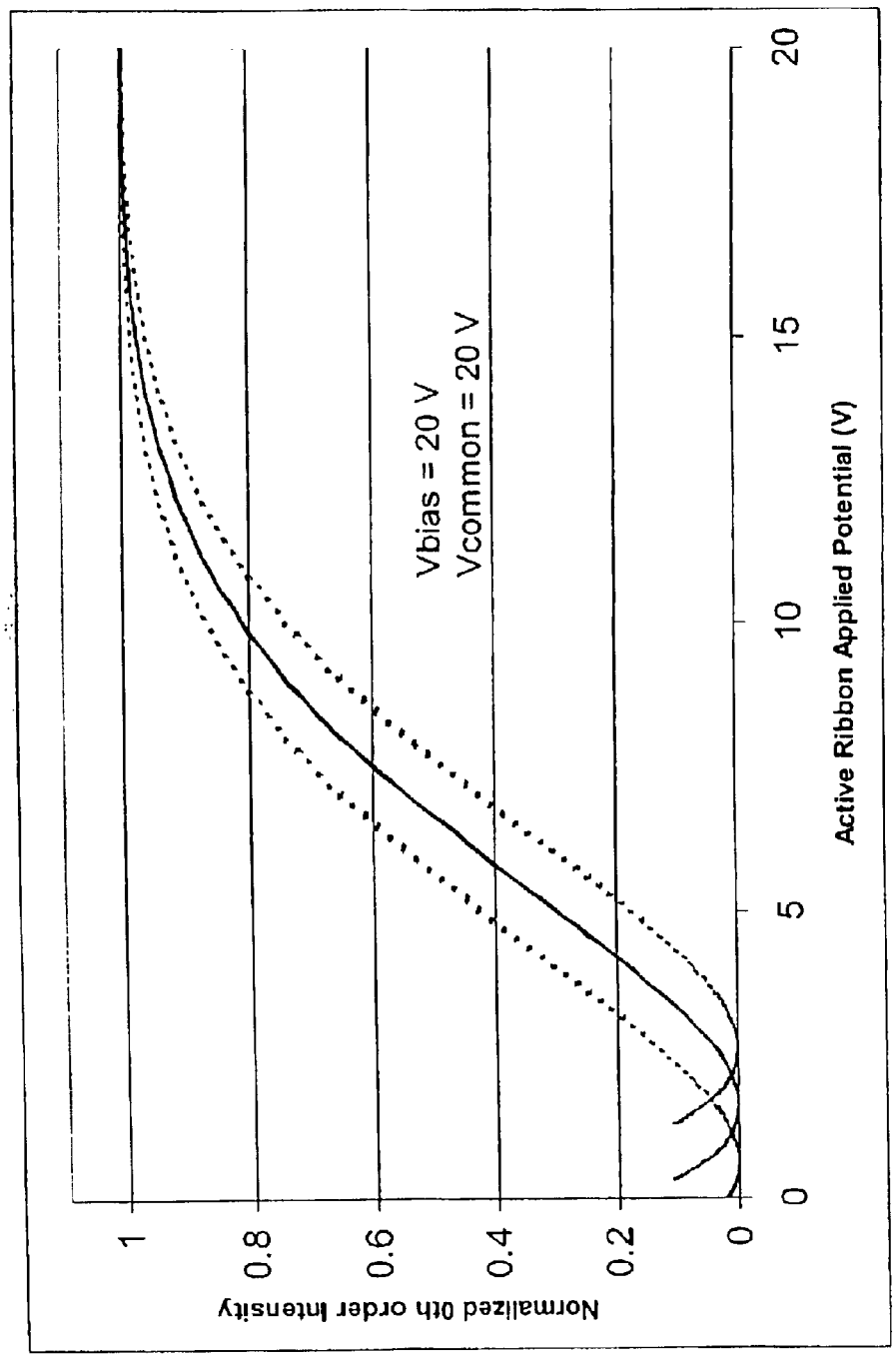
FIG. 10B is a graph depicting an electro-optic response for zero-order diffraction from a GLV element in a second unipolar configuration.

FIG. 10B is a graph depicting an electro-optic response for zero-order diffraction from a GLV element operating in a second polarity. As shown by FIG. 10A, the second polarity in this instance comprises a positive applied voltage to the bias ribbon and common electrode (while the active ribbon is held at ground). Again, the solid curve represents the normalized initial response prior to charge build-up in the GLV element. The two dashed curves represent the normalized responses with example offsets due to charge build-up, and the direction, magnitude, and rate of the voltage offset may depend on several factors.

Note that the bipolar operation illustrated in FIG. 9 may be implemented using a bipolar power supply that may supply both positive and negative voltages. On the other hand, the the bipolar operation illustrated in FIGS. 10A and 10B may be implemented using a unipolar power supply that may supply either a positive voltage (as illustrated) or a negative voltages (not illustrated).

Regarding the offsets in FIGS. 9, 10A and 10B, the applicants believe that the direction of the offset (whether moving to the left or moving to the right) is not necessarily determined solely by the polarity at which the element is being operated. In other words, the sign of the change in offset over time does not absolutely correlate to the polarity of operation.

More particularly, the applicants believe that two types of charging mechanisms affect the offset. Once a polarity switch occurs, a first charging mechanism is believed to initially dominate the change in offset. The first charging mechanism is believed to relate to charging of the active ribbon. Hence, the first charging mechanism may be referred to as ribbon charging. Ribbon charging is believed to occur relatively rapidly and to saturate at a relatively small voltage offset (for example, at roughly half a volt). Subsequently, a second charging mechanism is believed to dominate the change in offset. The second charging mechanism is believed to relate to charging of the common electrode. Hence, the second charging mechanism may be referred to as common electrode charging. Common electrode charging is believed to occur relatively slowly and to saturate at a much larger voltage offset. It is further believed that common electrode charging changes the offset in the opposite direction as ribbon charging. Thus, when ribbon charging dominates, the offset should be changing in one direction. Later, when ribbon charging is saturated and common electrode charging dominates, then the offset should be changing in the opposite direction.

Figure 11:
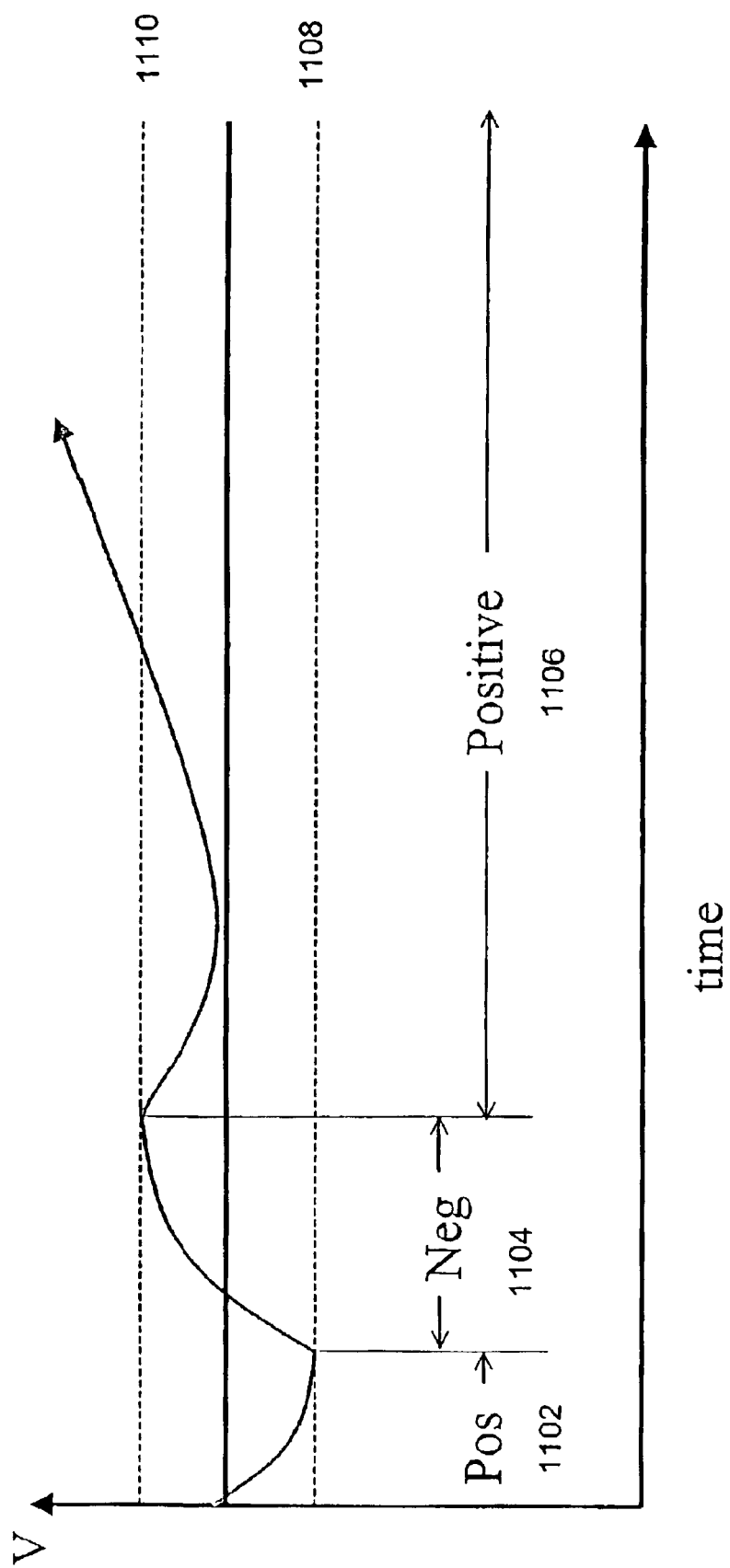
FIG. 11 is a graph depicting offset voltage due to charging for a case where common electrode charging overwhelms ribbon charging when using the first adaptive method described above in relation to FIG. 6.

FIG. 11 is a graph depicting offset voltage due to charging for a case where common electrode charging overwhelms ribbon charging when using the first adaptive method 600 described above in relation to FIG. 6. Three periods of operation (1102, 1104, and 1106) are shown in FIG. 11. In the example shown, the first period 1102 operates in a first (positive) polarity, the second period 1104 operates in a second (negative) polarity, and the third period 1106 operates in the first (positive) polarity.

During the first period 1102, while operating in the first (positive) polarity 602, the change in offset voltage has a negative direction as the offset voltage decreases over time. Here, the negative direction may be due to the initial ribbon charging. The polarity is then switched 606 from positive to negative when a first threshold voltage 1108 (lower dashed line in FIG. 11) is reached 604. In this case, the polarity switch 606 occurs while the change in offset voltage still has a negative direction over time. In other words, the polarity is switched 606 while the ribbon charging is still dominant because it has not yet saturated.

During the second period 1104, while operating in the second (negative) polarity 608, the change in offset voltage has a positive direction as the offset voltage decreases over time. Here, the positive direction may be due to the initial ribbon charging. The polarity is then switched 612 from negative to positive when a second threshold voltage 1110 (higher dashed line in FIG. 11) is reached 610. In this case, the polarity switch 612 occurs while the change in offset voltage still has a positive direction over time. In other words, the polarity is switched 612 while the ribbon charging is still dominant because it has not yet saturated.

During the third period 1106, while again operating in the first (positive) polarity 602, the change in offset voltage begins with a negative direction due to the initial ribbon charging. However, in this hypothetical case, the change in offset voltage reverses direction prior to the first threshold being reached. This may happen because the common electrode charging begins to dominate before reaching the first threshold 1108. In other words, the ribbon electrode saturates before the first threshold 1108 is reached. In this case, the expected polarity switch 606 may not occur. Instead, the now dominant common electrode charging may result in an increasingly large voltage offset that may go beyond the acceptable performance range for the device.

Figure 12:
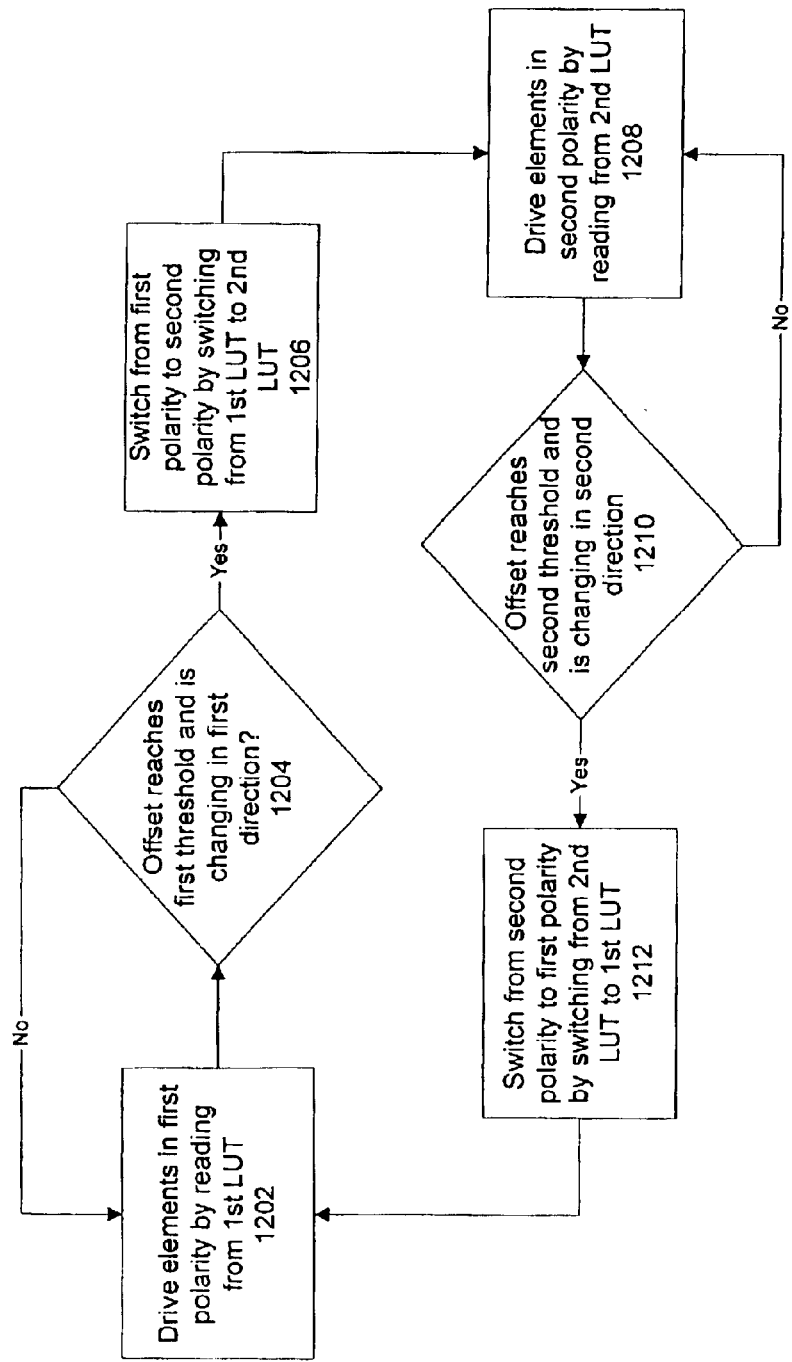
FIG. 12 is a flow chart depicting a second adaptive method for bipolar operation of a light-modulating array.

FIG. 12 is a flow chart depicting a second adaptive method 1200 for bipolar operation of a light-modulating array. As depicted, the second adaptive method 1200 includes six steps (1202, 1204, 1206, 1208, 1210, and 1212).

In the first step 1202, elements of the array are driven in a first polarity. The first polarity refers to an applied electric potential where the voltages driving the active elements are generally more positive than the voltage at the bias element and the common electrode. For example, the first polarity may correspond to positive voltages being applied to the active element while the bias element and the common electrode are held at ground (zero volts). For each element, the voltage to be applied to attain a desired intensity level may be determined by using a first look-up table (LUT). An example of such a first LUT is described below in relation to FIG. 8A.

In the second step 1204, a determination is made of whether an offset reaching a first threshold and whether the offset is changing in a first direction. The first threshold is a pre-set voltage that is substantially within the offset voltage range for acceptable performance. In other words, there is a voltage buffer between the first threshold and the offset voltage level at which device performance is deemed unacceptable. This buffer is to compensate for the overshoot anticipated to occur as the offset is expected to surpass the first threshold even after the polarity is switched. In addition to the first threshold being reached, the direction of change of the offset is also checked to see if it is in the first direction. The first direction corresponds to the direction of change associated with domination by common electrode charging during operation in the first polarity 1202. In other words, the first direction corresponds to the first polarity charging after the ribbon charging has saturated. When the offset passes the first threshold while it is moving in the first direction, then the method 1200 moves onto the third step 1206. Until then, the method 1200 continues by driving elements in the first polarity 1202.

In the third step 1206, the apparatus switches from operating in a first polarity mode to operating in a second polarity mode. The switch in polarity may be accomplished by switching from using the first LUT to using a second LUT.

In the fourth step 1208, elements of the array are driven in the second polarity. The second polarity refers to an applied electric potential where the voltages driving the active elements are generally more negative than the voltage at the bias element and the common electrode. In one implementation, the second polarity may correspond to negative voltages being applied to the active element while the bias element and the common electrode are held at ground. In another implementation, the second polarity may correspond to positive voltages being applied to the bias element and the common electrode while the active element is held at ground. For each element, the voltage to be applied to attain a desired intensity level may be determined by using a second look-up table (LUT). An example of such a second LUT is described below in relation to FIG. 8B.

In the fifth step 1210, a determination is made of whether an offset reaches a second threshold and whether the offset is changing in a second direction. Like the first threshold, the second threshold is a pre-set voltage that is substantially within the offset voltage range for acceptable performance. However, the second threshold relates to the opposite charging situation as the first threshold. In addition to the second threshold being reached, the direction of change of the offset is also checked to see if it is in the second direction. The second direction corresponds to the direction of change associated with domination by common electrode charging during operation in the second polarity 1208. In other words, the second direction corresponds to the second polarity charging after the ribbon charging has saturated. When the offset passes the second threshold while it is moving in the second direction, then the method 1200 moves onto the sixth step 1212. Until then, the method 1200 continues by driving elements in the second polarity 1202.

In the sixth step 1212, the apparatus switches from operating in the second polarity mode back to operating in the first polarity mode. This switch in polarity may be accomplished by switching from using the second LUT to using the first LUT. After the sixth step 1212, the process 1200 loops back to the first step 1202.

The method 1200 of FIG. 12 may be further understood in relation to FIG. 13 which is described below.

Figure 13:
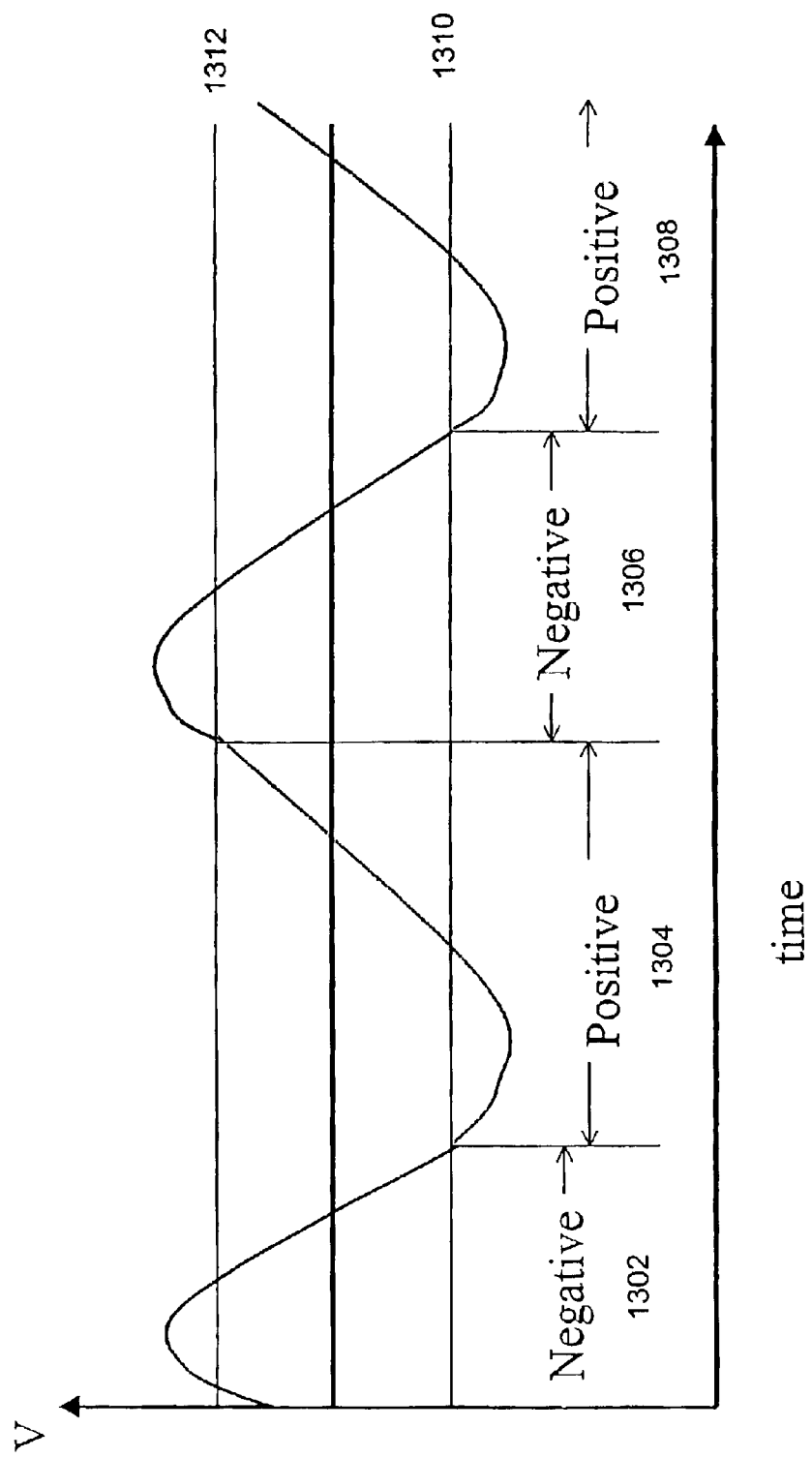
FIG. 13 is a graph depicting offset voltage when using the second adaptive method described above in relation to FIG. 12.

FIG. 13 is a graph depicting offset voltage when using the second adaptive method 1200 described above in relation to FIG. 12. Four periods of operation (1302, 1304, 1306, and 1308) are shown in FIG. 13. In the example shown, the first period 1302 operates in a first (negative) polarity, the second period 1304 operates in a second (positive) polarity, the third period 1306 operates in the first (negative) polarity, and the fourth period 1308 operates in the second (positive) polarity.

During the first period 1302, while operating in the first (positive) polarity 1202, the change in offset voltage begins in a positive direction (due to ribbon charging), then reverses to a negative direction (due to common electrode charging). The first period 1302 lasts until the offset voltage passes the first threshold 1310 while it is moving in a first (negative) direction (see the second step 1204 in FIG. 12). The prior two crossings of the second threshold 1312 do not trigger an end to the first period 1302. At the point when the offset voltage passes the first threshold 1310 while it is moving in the negative direction the polarity is switched 1206.

Similarly, during the second period 1304, while operating in the second (negative) polarity 1208, the change in offset voltage begins in the negative direction (due to ribbon charging), then reverses to the positive direction (due to common electrode charging). The second period 1304 lasts until the offset voltage passes the second threshold 1312 while it is moving in a second (positive) direction (see the fifth step 1210 in FIG. 12). The prior crossing of the first threshold 1310 does not trigger an end to the second period 1304. At the point when the offset voltage passes the second threshold 1312 while it is moving in the positive direction, the polarity is switched 1212.

The operation during the third period 1306 is analogous to the operation during the first period 1302. The operation during the fourth period 1308 is analogous to the operation during the second period 1304. Going forward, operation during odd periods is analogous to operation during the first period 1302, and operation during even periods is analogous to operation during the second period 1304.

By switching polarities when offsets exceed thresholds and are changing in specified directions as described above, situations such as the one illustrated in FIG. 11 may be avoided. This advantageously further keeps the performance of the device within acceptable bounds.

The above-described adaptive bipolar operation is applicable to all modes of operation for GLV devices (0th order diffraction, 1st order diffraction, 2nd order diffraction, and so on). The adaptive bipolar operation may also be applied to other types of capacitively coupled MEM devices, such as gimbaled mirrors.

An individual MEM device may be corrected for charge drift as described above. However, within arrays of devices, there may be different charging rates due to different applied potentials, different temperatures, and other factors. If a single bipolar duty cycle adapted to a particular device was applied for the entire array, then the single cycle may not necessarily maintain the entire array within specified performance bounds. If, however, the polarity duty cycle were varied on an individual basis for each element in the array, then this possible disadvantage would be circumvented.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for adaptive bipolar operation of a micro electromechanical (MEM) device, the method comprising:
    driving the MEM device in a first polarity;
    determining when an offset passes a first threshold; and
    switching from the first polarity to a second polarity when the offset passes the first threshold while deflection of the MEM device remains substantially unchanged.

2. The method of claim 1, further comprising:
    driving the MEM device in the second polarity;
    determining when the offset passes a second threshold; and
    switching from the second polarity to the first polarity when the offset passes the second threshold while deflection of the MEM device remains substantially unchanged.

3. The method of claim 2, wherein the method repeats.

4. The method of claim 1, wherein the offset represents a voltage offset of an electro-optic response of the device.

5. The method of claim 1, wherein switching between polarities reverses an electric field in the MEM device.

6. The method of claim 1, wherein the MEM device comprises a grating light valve type device.

7. The method of claim 6, wherein the first polarity comprises positive voltages on an active reflective element, and wherein the second polarity comprises negative voltages on the active reflective element.

8. The method of claim 6, wherein the fist polarity comprises positive voltages on an active reflective element while a common electrode and a bias reflective element are at ground, and wherein the second polarity comprises positive voltages on the common electrode and the bias reflective element while the active reflective element is at ground.

9. The method of claim 1, wherein the adaptive bipolar operation is used to maintain the MEM device within acceptable performance bounds.

10. The method of claim 1, wherein the method is performed during re-calibration of the MEM device.

11. A method for adaptive bipolar operation of a micro electromechanical (MEM) device, the method comprising:
    driving the MEM device in a first polarity;
    determining when an offset passes a first threshold;

switching from the first polarity to a second polarity when the, offset passes the first threshold; and determining if the offset is changing in a first direction when the offset passes the first threshold.

12. The method of claim 11, wherein switching from the first polarity to the second polarity only occurs if the offset is changing in the first direction.

13. A method for adaptive bipolar operation of a micro electromechanical (MEM) device the method comprising:

driving the MEM device in a first polarity;

determining when an offset passes a first threshold;

determining if the offset is changing in a first direction when the offset passes the first threshold;

switching from the first polarity to a second polarity when the offset passes the first threshold;

driving the MEM device in the second polarity;

determining when the offset passes a second threshold;

determining if the offset is changing in a second direction when the offset passes the second threshold; and switching from the second polarity to the first polarity when the offset passes the second threshold.

14. The method of claim 13, wherein switching from the first polarity to the second polarity only occurs if the offset is changing in the first direction, and wherein switching from the second polarity to the first polarity only occurs if the offset is changing in the second direction.

15. The method of claim 14, wherein performance of the MEM device outside of acceptable bounds is avoided in at least one situation.

16. An apparatus for adaptive bipolar operation of a micro electromechanical (MEM) device, the apparatus comprising:

a first look-up table (LUT) for use in driving the MEM device in a first polarity;

a circuit for determining when an offset passes a first threshold; and a polarity switch for switching from the first polarity to a second polarity when the offset passes the first threshold.

17. The apparatus of claim 16, further comprising:

a second LUT for use in driving the MEM device in the second polarity; and a second circuit for determining when the offset passes a second threshold, wherein the polarity switch switches from the second polarity to the first polarity when the offset passes the second threshold.

18. The apparatus of clam 17, further comprising:

circuitry for determining if the offset is changing in a first direction when the offset passes the first threshold and for determining if the offset is changing in a second direction when the offset passes the second threshold.

19. The apparatus of claim 18, wherein the polarity switch switches from the first polarity to the second polarity only if the offset is changing in the first direction, and the polarity switch switches from the second polarity to the first polarity only if the offset is changing in the second direction.

20. A system for adaptive bipolar operation of a micro electromechanical (MEM) device, the system comprising:

means for driving the MEM device in a first polarity;

means for determining when an offset passes a first threshold; and means for switching from the first polarity to a second polarity when the offset passes the first threshold while deflection of the MEM device remains substantially unchanged.

* * * * *